No. 667,724. Patented Feb. 12, 1901.
W. G. MURPHY.
ACETYLENE GAS GENERATOR.
(Application filed June 12, 1900.)
(No Model.)
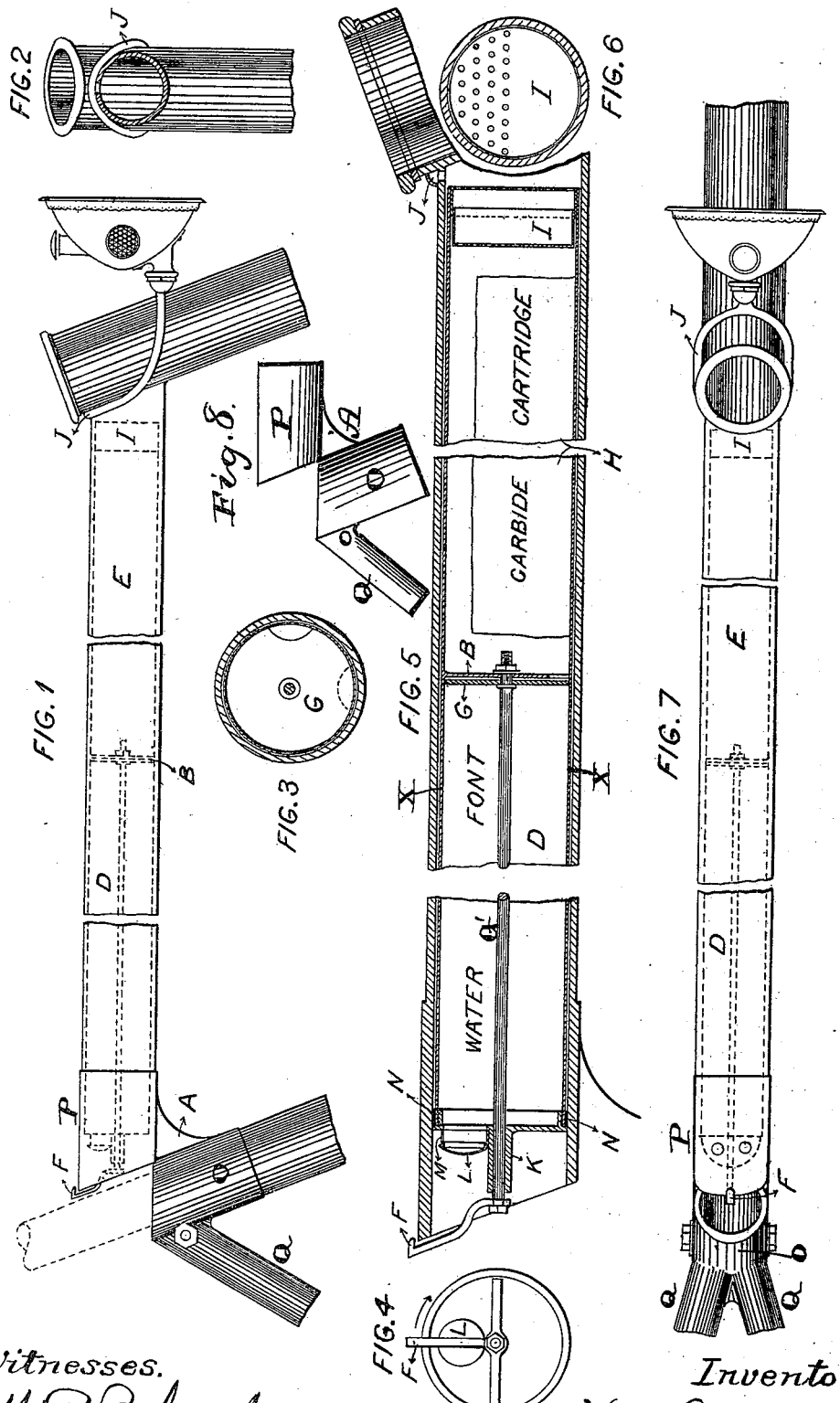

UNITED STATES PATENT OFFICE.

WALTER GIBBS MURPHY, OF NEW YORK, N. Y.

ACETYLENE-GAS GENERATOR.

SPECIFICATION forming part of Letters Patent No. 667,724, dated February 12, 1901.

Application filed June 12, 1900. Serial No. 20,025. (No model.)

*To all whom it may concern:*

Be it known that I, WALTER GIBBS MURPHY, a citizen of the United States, residing at New York, in the county of New York and State of New York, have invented an Improvement in Acetylene-Gas Generators, of which the following is a specification.

My invention relates to bicycle-lamps; and my object is to utilize a portion of the frame of the bicycle or other vehicle as a receptacle for a gas holder and generator.

While my invention will be especially desirable and valuable for use in connection with bicycles, it will be understood that it will also be found useful in connection with all manner of vehicles where it may be desirable to dispose the carbid-receptacle so that it will be unobstructive and out of sight.

My invention may be readily applied to use upon a bicycle as now commonly constructed, very little special adaptation being necessary to render a portion of the frame available for the reception of my acetylene-gas generator.

The advantages and preferred materialization of my invention will be hereinafter fully set forth, and illustrated in the accompanying drawings, in which—

Figure 1 is a side elevation showing the top bar of a bicycle provided with my gas-generator and also showing a suitable reflector attached in its operative position. Fig. 2 is a vertical section of the top bar of the bicycle, taken immediately in the rear of the bicycle-head. Fig. 3 is a vertical section of Figs. 1 and 5, taken on a line with the inner face of the valve-disk. Fig. 4 is a rear end view of Fig. 5. Fig. 5 is a longitudinal vertical section of the upper bar of a bicycle, also showing in section my carbid-gas generator. Fig. 6 is a detail view showing a cross-section of the upper bar of a bicycle and an elevation of the closure employed in connection with the carbid-chamber. Fig. 7 is a top view of Fig. 1. Fig. 8 is a side elevation of the coupling alone.

In order to conveniently refer to the several parts of my invention and their coöperating accessories, letters of reference will be employed, the same letter designating the same part throughout the several views.

By reference to the drawings it will be seen that a bicycle-frame as now commonly constructed requires very little special adaptation or change to fit it for the ready reception of my gas-generating cylinder, thereby making it inexpensive to apply my invention to use. It will be further observed that no part of the bicycle-frame is in any wise weakened, a very important desideratum, while the weight of the wheel is not materially increased.

Referring to the drawings, A indicates a special form of union, one part O of which may receive the vertical portion of the frame, while the other part E thereof is designed to receive the rear end of the upper bar, the seat-post being accommodated in the usual manner by the vertical or upright portion of the frame. Projecting downwardly at a suitable angle are the parts Q, which receive the upper ends of the rods, which extend down to the rear wheel. This coupling A is open at the rear of the upper bar and next to the seat-post, so that the lever F, attached to the shaft or rod G', can be freely operated without having to remove or detach any of the parts. By having the horizontal opening through this coupling the cylindrical casing X can be removed and replaced by the removal of the seat-post.

While my gas-generator may be disposed in any preferred part of the frame of a bicycle, it is thought that best results will follow when the generator is disposed within the upper bar of the frame, inasmuch as this portion of the frame is more readily accessible and convenient to the point where it is desired to locate the lamp, which latter may be supported in any preferred way. Within the upper bar I dispose a preferably cylindrical casing, as shown in Fig. 5, said casing being provided with a partition-wall B, thereby providing two compartments, the forward one of which is designed as a carbid-receptacle and gas-generating chamber, while the rear compartment serves as a reservoir for water. For convenience the forward compartment or carbid-receptacle is designated E. The partition B is provided upon its lower side with an opening, and designed to coöperate with said partition is the rotary adjustable disk G, which latter is also provided with an aperture corresponding in size to the aperture provided in said partition, and in order to conveniently operate the disk G, I attach thereto or integrally form therewith the controlling shaft or rod G', which extends rearwardly through the cap K, which latter is screwed into the end of the cylinder and may therefore be readily removed. The rear end of the shaft G' has attached thereto an operating-lever F, and it is obvious that by partly rotating said shaft the disk G may be turned so as to bring the opening provided in the edge thereof into registration with the opening in the partition B, and thus permit the water to flow from the reservoir D into the carbid-chamber E when it is desired that gas shall be generated. The removable head K is provided with a flanged aperture having a removable cap L, the upper side of the flange being provided with an opening M, designed to serve as a vent for any excess of gas generated.

The shaft G', it will be observed in Fig. 5, is rigidly attached to the disk G, extends loosely through an aperture provided in the partition B, and is secured in position by a suitable nut placed on the end thereof, it being understood that the disk and partition are to be properly fitted, so as to provide a water-tight joint except when the apertures in said parts are brought into registration, as above set forth.

By the arrangement just described it is obvious that the disk valve G may be so manipulated that a very small or large opening is provided, thus placing the generation of gas completely under the control of the operator.

In Fig. 5 I have shown a carbid-cartridge in position, as indicated by H. Said cartridge, it will be understood, may be placed in a cotton bag or a casing of absorbent blotting-paper or other form of holder, which affords a clean method of handling the carbid.

It will be understood that any desired size of cartridge may be introduced, thus determining the capacity of the lamp. I indicates a suitable stopper or closure, which preferably consists of two cap-like or flanged disks, one telescoping with the other, it being understood that a suitable fibrous packing shall be interposed between them. Both of said caps are perforated, as shown in Fig. 6, the outer cap being perforated upon its lower edge, while the inner cap is perforated upon its upper edge, thus extending the length of the path of the gas and guarding against leakage and also insuring that the gas will be directed through the meshes of the straining material interposed between the caps, thereby preventing dust or the like from passing to the lamp.

J indicates the conveyer-tube or passage extending from the carbid-chamber to the burner, it being understood that said tube may be constructed in any preferred way and located at a convenient point to reach the burner in order that it may be disposed at the desired point. By this arrangement the burner and its reflector may be readily detached from their operative positions and carried in the pocket when so desired.

The cylinder-head K may be readily removed with the shaft G' and the valve attached thereto after the nut upon the inner end of the shaft has been removed, thereby enabling the valve G to be easily examined and renewed, if necessary.

In order to fill the reservoir, all that is necessary is to remove the closure L, as is obvious. The entire casing comprising the two compartments may be easily withdrawn from its operative position, inasmuch as it is only held friction-tight therein by means of a rubber gasket N, though it will be understood that any preferred means, as a set-screw or the like, may be adopted for this purpose.

Should there be too much gas generated, the excess will pass out through the water in the reservoir D and thence through the opening M.

It will be understood that the several parts of my invention may be very cheaply and expeditiously constructed and readily applied to use upon bicycles and other vehicles substantially in the manner herein set forth.

My improved gas-generating lamp possesses many advantages, inasmuch as it is economical, and being wholly inclosed within the tube of the bicycle-frame is therefore protected against casualties. It is unobstructive, being wholly out of sight, and therefore enables the bicycle or other vehicle to present a neat sightly appearance. It is furthermore protected from rain and injury from dust or mud and is always ready for use. Inasmuch as the vent M is provided for excess of gas, it is non-explosive.

It will also be readily apparent that the tubing of the frame may be utilized as a housing, in which may be disposed a supply of oil or an electric battery or a supply of gas, my object being, as above stated, to make it possible to supply the burner without rendering the vehicle unsightly or unduly increasing the weight.

Other objects and advantages, it is thought, have been made fully apparent from the foregoing specification, considered in connection with the accompanying drawings.

While I have described the preferred construction which may be adopted in materializing my invention, it will be understood that I desire to comprehend in this application all such substantial equivalents and substitutes as may be considered to fall fairly within the scope and purview of my invention.

Believing that the advantages, use, and construction of my invention have been made fully apparent from the foregoing specification, further reference to the details thereof is deemed unnecessary.

Having thus fully described my invention, what I claim as new, and desire to secure by Letters Patent, is—

1. In a bicycle-lamp, a cylindrical casing, a vertical perforated partition placed therein, the perforated rotary adjustable disk placed against and operating in connection with said partition, an operating rod or shaft secured to said disk, and a lever connected to the rear end of the rod, adapted to project above the inclosing top bar of the bicycle-frame, combined with the removable head K, for closing the outer end of the cylinder and forming a bearing for the operating-rod, the removable cap for closing an opening in the end of the cylinder; a stopper or closure for the inner end of the cylinder, composed of two perforated cap-like flanged disks, a pipe for conducting the gas, and the burner connected to and supported by the said pipe, substantially as described.

2. In lamps for bicycles, the combination with the burner, of a cylindrical casing designed to fit within the tube of the bicycle-frame, said casing having a carbid-chamber and a water-reservoir; a closure consisting of two telescoping perforated caps and an interposed packing of fibrous material, said water-reservoir having a closure-cap L and a vent-opening M and a disk coöperating with the partition between the reservoir and carbid-chamber and a controlling-shaft and lever attached to said shaft for operating said disk whereby the desired quantity of water will be admitted into the carbid-chamber and the gas-producer from thence directed to the burner as desired, all combined substantially in the manner specified and for the purpose set forth.

In testimony whereof I affix my signature in presence of two witnesses.

WALTER GIBBS MURPHY.

Witnesses:
    JOS. P. BICKERTON,
    E. L. ASHBAUGH.